US012631547B2

(12) United States Patent
Mazzio et al.

(10) Patent No.: US 12,631,547 B2
(45) Date of Patent: May 19, 2026

(54) SYSTEM AND METHOD TO MATCH PARTS USING PATTERN RECOGNITION

(71) Applicant: Communications Test Design, Inc., West Chester, PA (US)

(72) Inventors: Victor F. Mazzio, West Chester, PA (US); Krutarth Patel, Philadelphia, PA (US)

(73) Assignee: Communications Test Design, Inc., West Chester, PA (US)

( * ) Notice: Subject to any disclaimer, the term of this patent is extended or adjusted under 35 U.S.C. 154(b) by 43 days.

(21) Appl. No.: 18/706,484

(22) PCT Filed: Jan. 19, 2023

(86) PCT No.: PCT/US2023/011153
§ 371 (c)(1),
(2) Date: May 1, 2024

(87) PCT Pub. No.: WO2023/141214
PCT Pub. Date: Jul. 27, 2023

(65) Prior Publication Data
US 2025/0003863 A1      Jan. 2, 2025

Related U.S. Application Data

(60) Provisional application No. 63/300,703, filed on Jan. 19, 2022.

(51) Int. Cl.
*G01N 21/01* (2006.01)
*G01N 21/71* (2006.01)

(52) U.S. Cl.
CPC ........... *G01N 21/01* (2013.01); *G01N 21/718* (2013.01); *G01N 2021/0112* (2013.01)

(58) Field of Classification Search
CPC ................. G01N 21/01; G01N 21/718; G01N 2021/0112; G01S 17/08; G01S 17/86;
(Continued)

(56) References Cited

U.S. PATENT DOCUMENTS 5,892,543 A  *  4/1999  Zheng .................. H04N 23/673
                                                          348/347
6,369,954 B1      4/2002  Berge et al.
(Continued)

FOREIGN PATENT DOCUMENTS

KR        20210051002 A      5/2021

OTHER PUBLICATIONS

Yao et al "Spectrograph Controller System", Sep. 2, 2022, CN 217359588 U (Year: 2022).*
(Continued)

*Primary Examiner* — Sang H Nguyen
(74) *Attorney, Agent, or Firm* — Duane Morris LLP

(57)      ABSTRACT
A parts matching system includes a camera: a depth sensor: a dichroic mirror that passes light of an image scene of a device under test to the camera and reflects laser light emitted from the depth sensor to the device under test and reflects the laser light reflected from the device under test to the depth sensor; and a computer that processes (i) data received from the depth sensor to determine a distance of the device under test to the camera and (ii) image data of the device under test received from the camera.

20 Claims, 4 Drawing Sheets

(58) Field of Classification Search
    CPC ...... G01S 17/88; G03B 13/36; G06V 10/147;
        G06V 20/64; H04N 23/67; H04N 23/671;
                                          G06F 16/583
    See application file for complete search history.

(56)                 References Cited

U.S. PATENT DOCUMENTS

| | | | | |
|---|---|---|---|---|
| 8,576,390 | B1 * | 11/2013 | Nunnink .................. | G06T 7/80 |
| | | | | 356/126 |
| 8,964,298 | B2 | 2/2015 | Haddick et al. | |
| 2005/0281476 | A1 * | 12/2005 | Tanikawa ............. | A61B 5/0059 |
| | | | | 382/128 |
| 2008/0040004 | A1 | 2/2008 | Breed | |
| 2012/0249740 | A1 * | 10/2012 | Lee ...................... | H04N 13/207 |
| | | | | 348/46 |
| 2013/0222605 | A1 * | 8/2013 | Rukes .................. | H04N 17/002 |
| | | | | 348/E17.002 |
| 2013/0306615 | A1 * | 11/2013 | Rozbicki .................. | G02B 7/32 |
| | | | | 248/205.5 |

| | | | | |
|---|---|---|---|---|
| 2015/0022675 | A1 | 1/2015 | Lord et al. | |
| 2016/0160276 | A1 | 6/2016 | Earney et al. | |
| 2016/0364015 | A1 | 12/2016 | Send et al. | |
| 2017/0213353 | A1 * | 7/2017 | Ohi .................... | H04N 1/00267 |
| 2018/0284268 | A1 * | 10/2018 | McWhirter .......... | G01S 7/4816 |
| 2020/0016677 | A1 | 1/2020 | Nadler et al. | |
| 2020/0379232 | A1 * | 12/2020 | Feirer ................. | G02B 21/244 |
| 2021/0405267 | A1 * | 12/2021 | Oteo ...................... | G02B 7/008 |

OTHER PUBLICATIONS

Extended European Search Report for European Patent Application
No. 23743723.1 dated Nov. 17, 2025, 9 pages.
International Search Report and Written Opinion for PCT Interna-
tional Application No. PCT/US2023/011153 issued Jun. 29, 2023.
Ghobadi, "Real Time Object Recognition and Tracking Using
2D/3D Images" Universitat Siegen. Web. Sep. 16, 2010, pp. 1-141;
[retrieved May 31, 2023]. Retrieved from the Internet: <URL:
https://dspace.ub.uni-slegen.de/bitstream/ubsi/455/1/ghobadi.pdf>.

* cited by examiner

SYSTEM AND METHOD TO MATCH PARTS USING PATTERN RECOGNITION

CROSS-REFERENCE TO RELATED APPLICATIONS

This application is a National Stage Application, filed under 35 U.S.C. 371, of International Patent Application No. PCT/US2023/011153, filed on 19 Jan. 2023, which claims priority to U.S. Provisional Application No. 63/300,703 filed 19 Jan. 2022 entitled "System and Method to Match Parts Using Pattern Recognition", the entireties of which are incorporated herein by reference.

BACKGROUND

The present disclosure relates to a system and method to match parts using pattern recognition. More specifically, the present invention relates to a camera vision system and method to recognize patterns of dimensional barcodes, two-dimensional barcodes, textual patterns, image patterns, and other patterns to match compatible parts.

One example described in the current disclosure is to use the disclosed system and method to pair power supply units (PSU) to routers and other customer premises equipment (CPE) based on specific voltage and current requirements. Motivation for this development includes, at least in part, an interest in satisfying Occupational Safety and Health Administration (OSHA) and/or Underwriters' Laboratory (UL) requirements. Based on the technical breadth of the methods, instrumentation, and system developed as part of this disclosure, it is anticipated that the scope of this initial purpose can be expanded into areas beyond the pairing of PSUs to CPEs. Current art in the field of parts matching for order fulfillment or other manufacturing operations involves predominantly manual processes where some or all of the following processes are employed: barcode reading, single order picking, batch picking, cluster picking, wave picking, zone picking, and voice picking. Significant undesirable characteristics within current parts picking matching operations include long manual processing times to assemble a single order (1-5 minutes), and/or (2) incompatible parts in an order (5-10% occurrence).

SUMMARY OF THE INVENTION

To overcome the problems described above, current embodiments of the present disclosure provide systems including a first embodiment of a system where customer premises equipment (CPE) (e.g., routers, etc.) barcodes are read by a camera system and power supply units (PSU) model numbers are read directly with a separate vision system using optical character recognition (OCR) as a pattern recognition tool. A second embodiment involves a system where CPE barcodes are read directly with a vision system and PSU model numbers are determined by the same vision system from recognition of icon and text patterns on each power supply unit that uniquely distinguish one power supply unit from another. The second embodiment may be faster, more reliable, and more accurate in detecting PSU model numbers than the first embodiment.

System components including a configuration of an optical component, which is critical to proper function of the parts matching system, is presented and described. This optical component accomplishes the essential tasks of: (1) auto-focusing a single vision system camera used in the system, and (2) directing a depth sensor optical path such that it is in co-axial alignment with the primary optical path of the vision system camera.

An automated system and device using vision system technology of the current disclosure includes a digital camera, a variable focus liquid lens, and an optical component developed for this application. With the described system, PSUs may be accurately matched to routers (or other CPEs) 100% of the time, and, in certain embodiments, one or more of the following additional characteristics may be evident: (1) processing time from start to finish of 12 seconds, (2) capability to create 300 matched PSU-CPE pairs in 1 hour, (3) capability to create 2400 matched PSU-CPE pairs in 8 hours, and (4) ability to quickly reduce processing times further by using available upgraded vision system cameras.

A parts matching system includes a camera; a depth sensor; a dichroic mirror that passes light of an image scene of a device under test to the camera and reflects laser light emitted from the depth sensor to the device under test and reflects the laser light reflected from the device under test to the depth sensor; and a computer that processes (i) data received from the depth sensor to determine a distance of the device under test to the camera and (ii) image data of the device under test received from the camera.

The system can further include a variable focus lens for the camera that is controlled by the computer to automatically focus at the distance of the device under test to the camera based on the data received from the depth sensor.

In the system the computer compares an image of a first device under test to a database of images to determine if the first device under test is operationally compatible with a second device under test.

A method of matching parts includes creating a database of compatible parts; capturing a first digital image of a first device under test; comparing the first digital image to the database to identify parts compatible with the first device under test; and reporting a list of the parts compatible with the first device under test.

The method can further include prior to capturing the first digital image, determining a distance from a camera to the first device under test; and automatically adjusting focus of a lens for the camera based on the distance.

In the method, the determining a distance from the camera to the first device under test includes reflecting a laser from the first device under test to a sensor.

In the method, the adjusting focus of the lens includes forwarding a command to the lens to set the focus that is based on the distance from the camera to the first device under test.

The method can further include capturing a second digital image of a second device under test; comparing the second digital image to the database to determine if the second device under test is compatible with the first device under test.

The method can further include passing image light through a dichroic filter to a camera to capture the first digital image; and reflecting a laser light by the dichroic filter to the first device under test to a sensor to determine a focus distance for the camera.

The method can further include locating the camera and the sensor a same distance from the dichroic filter.

The above and other features, elements, characteristics, steps, and advantages of the present invention will become more apparent from the following detailed description of preferred embodiments of the present invention with reference to the attached drawings.

DETAILED DESCRIPTION

Figure 1:
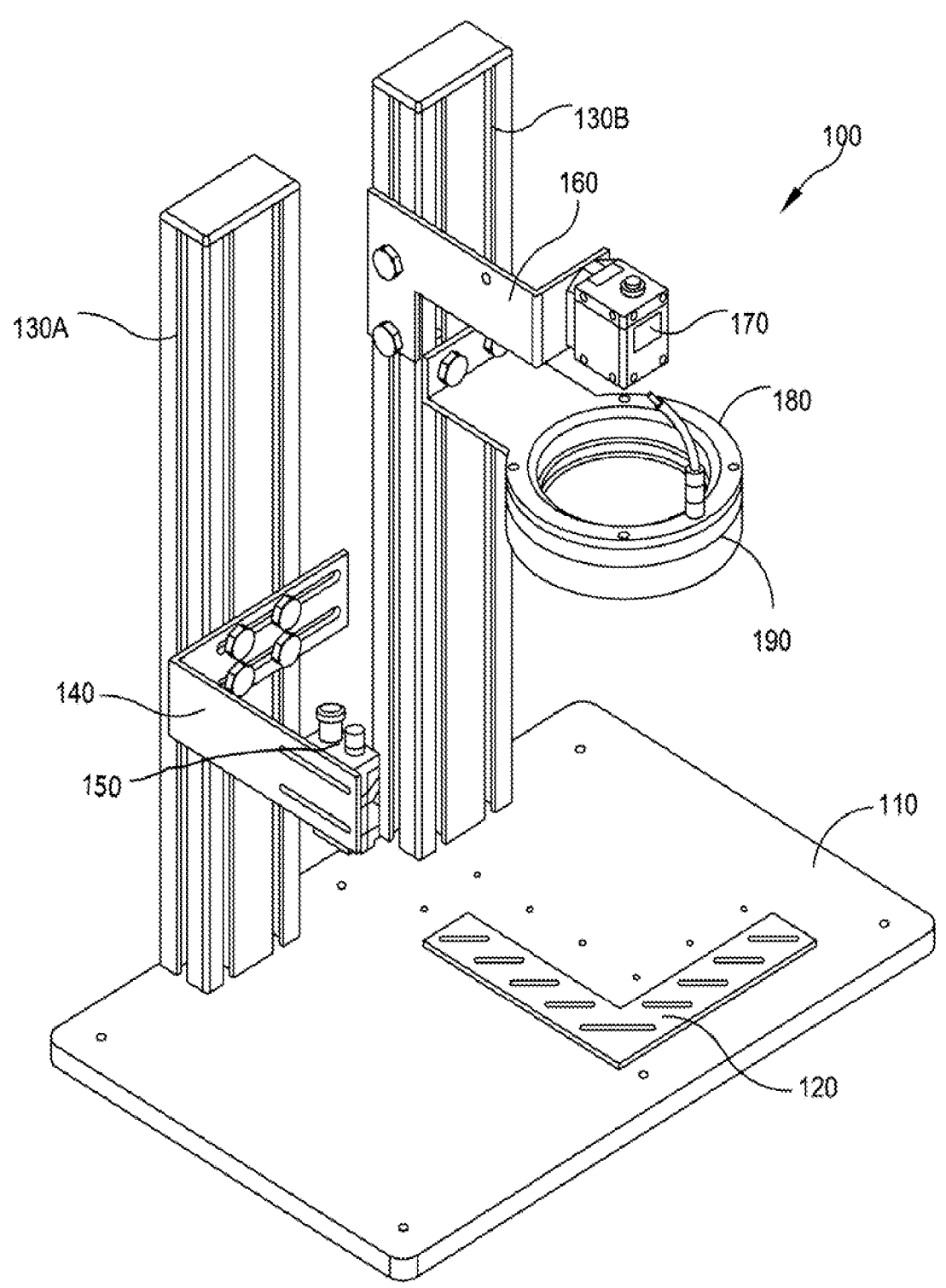
FIG. 1 is a drawing of a parts matching system according to an embodiment of the present disclosure.

FIG. 1 is a view of a system 100 to match parts according to a first embodiment of the present disclosure. As shown, the system 100 can include a horizontally oriented base 110 to mount two vertically oriented stands 130A and 130B in which instrumentation is attached. The base 110 can include an index 120 that may be configured as an L-shape, or other shape, and used to orient parts for recognition in the system 100. The left-side stand 130A can be configured to mount a scanner 150 via a scanner bracket mount 140. For example, the scanner 150 can be a Cognex DM260 series Compact Barcode Scanner or equivalent. The right-side stand 130B can be configured to mount a camera 170 via a camera bracket mount 160. For example, the camera can be a Keyence CA-H500CX or equivalent. The right-side stand 130B can also be configured to mount a ring light 190 via a ring light mount 180 to illuminate parts placed on the base 110.

The system 100 can include the scanner 150 used to read barcodes of CPEs at one location on the base 110 and a separate vision system including the camera 170 used to read labels of PSUs showing model numbers. The labels of the PSUs can be read directly using OCR as a pattern recognition tool.

Figure 2:
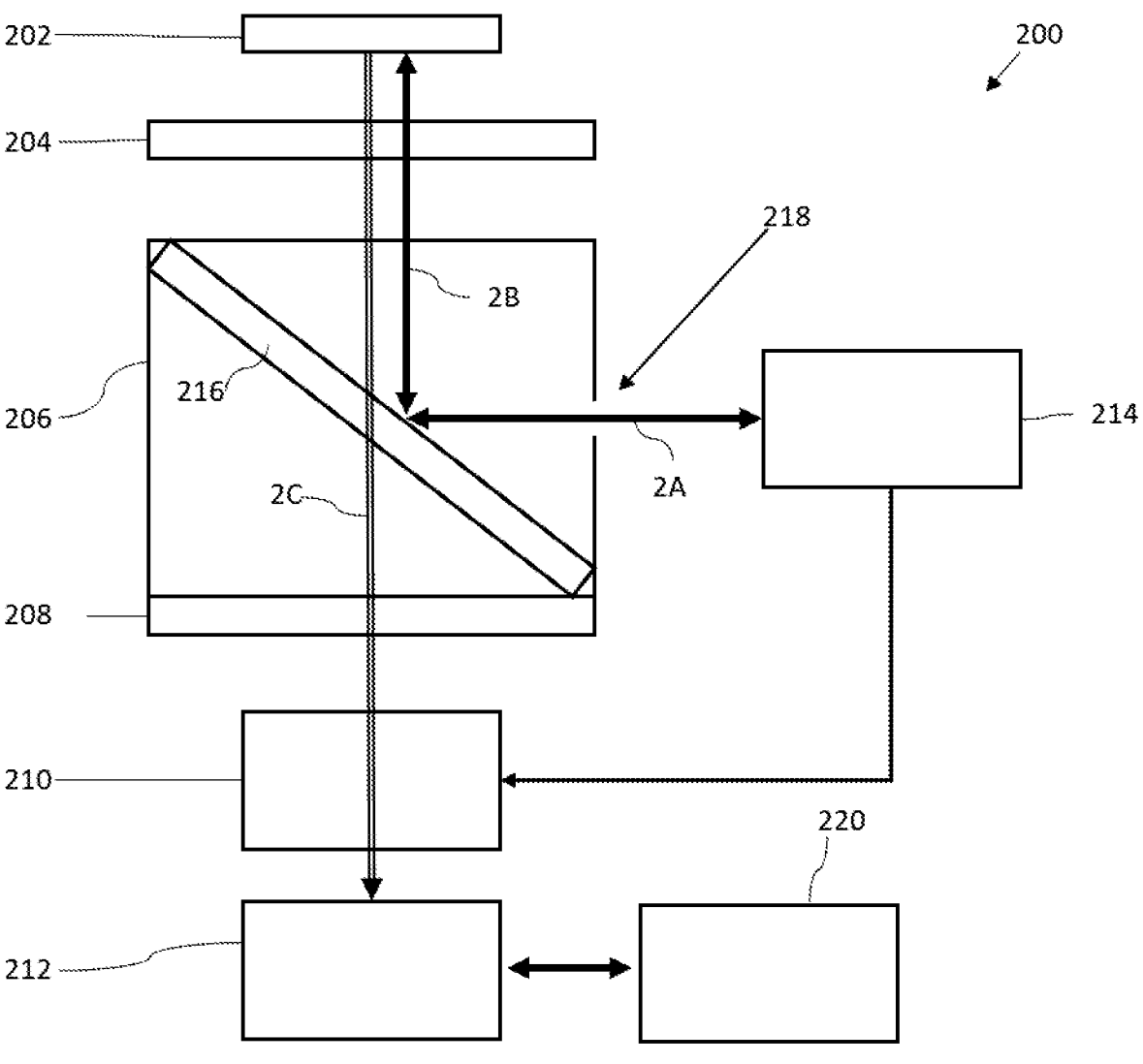
FIG. 2 is a block diagram of a single camera optical path configuration according to an embodiment of the present disclosure.

In another embodiment, the scanner and the camera vision system can share an optical path. FIG. 2 is a schematic layout of a system 200 that includes a single camera optical path configuration according to a second embodiment of the present disclosure. The mounting and support structure of system 200 can be similar to that shown in FIG. 1.

The device under test or specimen 202 in FIG. 2 can be a CPE or a PSU. The vision system can include a digital camera 212, a variable focus liquid lens 210, and a computer system 220 in communication with the camera 212. Like in the system 100, the camera 212 can be a Keyence CA-H500CX or equivalent. The computer can be a processor, a central processing unit, a personal computer, or a network of computers that includes a user interface and a memory to store program modules and data. The program modules can include a graphical user interface (GUI) to run the system 200 to match parts as discussed in more detail below. An application program module can be included in the computer 220 to capture digital images from the camera 212 and perform image processing on the captured images.

As shown in FIG. 2, the camera 212 and the variable focus liquid lens 210 receive visible light 2C from a ring light 204 that is reflected from a surface of the device under test 202 within the transmission range of a dichroic mirror 216. For example, the transmission range of the dichroic mirror can be 300-600 nm. The device under test 202 is also illuminated with depth sensor laser light 2A that has been emitted from a depth sensor 214 and reflected from the dichroic mirror 216 toward the device under test 202 which reflects the depth sensor laser light 2A back to the depth sensor 214 as reflected laser light 2B. For example, the wavelength of the depth sensor laser light 2A can be 660 nm. Depth sensor laser light 2A is reflected by the dichroic mirror 216 which has a reflection range of 600-700 nm. As such, the depth sensor laser light 2A and reflected laser light 2B never reach the camera 212 and will not interfere with the vision system.

The liquid lens 210 and the depth sensor 214 can be calibrated and configured such that 'focus voltages' can be sent from the depth sensor 214 to the liquid lens 210. The 'focus voltages' are a function of the depth or distance sensed between the depth sensor 214 and the surface of the device under test 202 so that the liquid lens 210 can focus the reflected light 2C to the camera 212.

As shown, the dichroic mirror 216 can be contained within a barrier tube 206 that is open on both ends. The barrier tube 206 also includes an opening 218 in the side to permit the depth sensor laser light 2C to enter the barrier tube 206 and be directed to the device under test 202 by the dichroic mirror 216. Visible light 2C reflected from the device under test 202 travels through the dichroic mirror 216, though a barrier filter 208, and to the camera 212. The transmission characteristics of the dichroic mirror 216 and the barrier filter 208 are such that any depth sensor laser light 2A and reflected laser light 2B is blocked from ever reaching the camera 212.

In some embodiments, a laser crosshair projector can be substituted for or provided in addition to the depth sensor 214. For example, the laser crosshair projector can emit a laser crosshair at 635 nm and be provided by Laserglow Technologies. The dichroic mirror 216 has a transmission range of 300-600 nm and a reflection range of 600-700 nm. As such, the dichroic mirror allows 300-600 nm transmitted light to reach the vision system (i.e., camera 212, liquid lens 210, and computer 220) while reflected light from the depth sensor and/or laser crosshair never reaches the vision system.

In an embodiment, optical components for this device can be provided from, for example, Edmund Optics. In an embodiment, the liquid lens 210 is a Corning® Varioptic®-Variable Focus Liquid Lens. In another embodiment, the liquid lens is a 16 mm, f/5, Liquid Lens Cx Series Fixed Focal Length Lens. In an embodiment, the dichroic mirror 216 is a 600 nm, 25.2×35.6 mm, Dichroic Shortpass Filter. In an embodiment, the depth sensor 214 (660 nm) is either provided by Keyence Corporation of America or a laser crosshair projector (635 nm) provided by Laserglow Technologies.

For proper, accurate, and reliable recognition of patterns by a vision system, it is important that laser light from a depth sensor or other optical component—such as a laser crosshair projection component—not reach the camera 212. The presence of laser crosshairs in this image can interfere with proper reading of a barcode on a product label.

Figure 3:
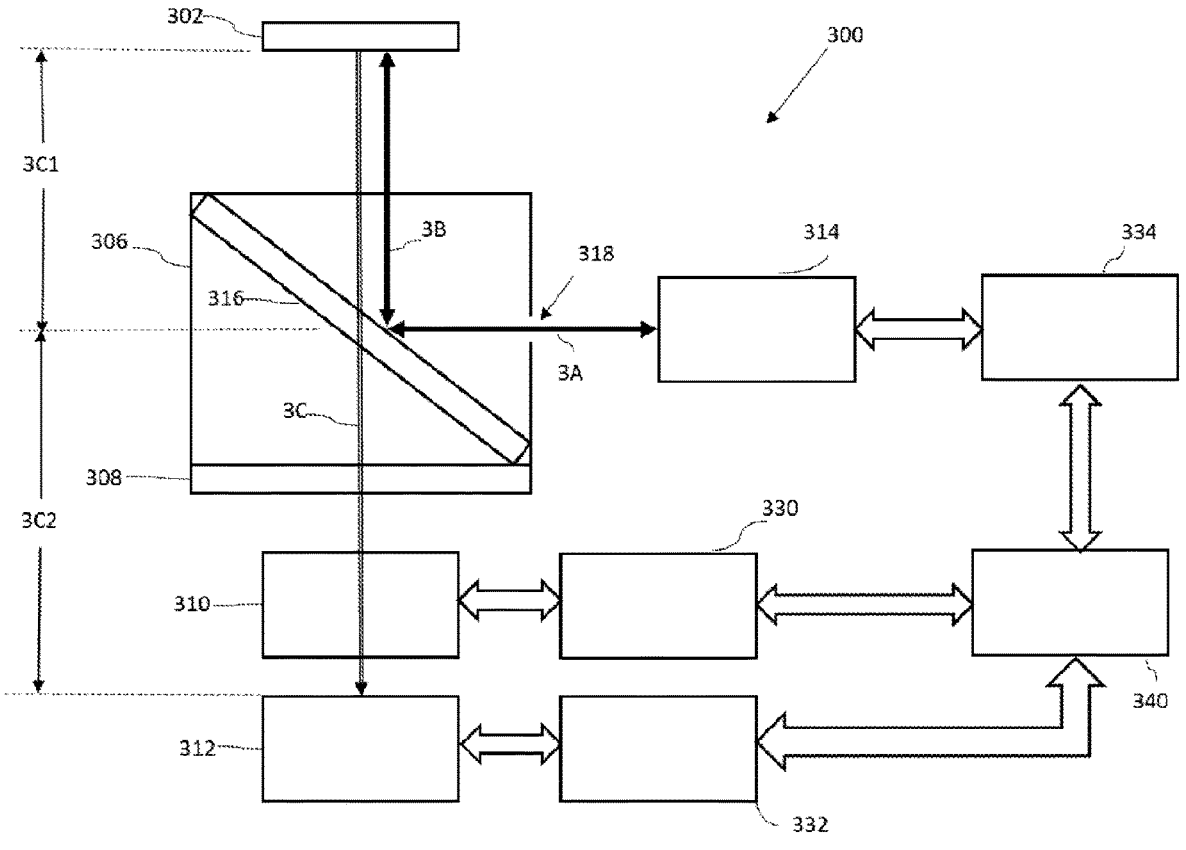
FIG. 3 is a block diagram of a single camera optical path configuration according to an embodiment.

FIG. 3 is a block diagram of a system 300 according to an embodiment of the present disclosure. The system 300 is similar to the system 200 and includes several interim control circuits. FIG. 3 is also used to describe critical optical parameters of the system 300.

As shown, the system 300 can include a computer 340 with an operating system capable of running a custom graphic user interface GUI. The computer 340 can be a stand-alone device or a portion of a network and include a computer readable memory to store the operating system, the system application, a database of images, and operational results. The computer 340 can be interfaced with and control the operation of a depth sensor 314 (e.g., Keyence Depth Sensor) via a sensor controller 334 (e.g., Arduino Uno R3 Microcontroller), a camera 312 (e.g., Keyence Camera) via a camera controller 332 (e.g., Keyence Camera Controller), and a variable focus lens 310 (i.e., Varioptic Liquid Lens) via a lens controller 330 (e.g., Max 14574 Control Board). The variable focus lens 310 is used to adjust the focus of the camera 312 to be within a range of different distances. As previously mentioned and shown in FIG. 2, the system 300 can include a dichroic mirror 316. Although not shown, the system 300 can also include an ambient light source such as a ring light to illuminate a device under test 302 and provide light for an image to be captured by the camera 312.

The system 300 can include two optical paths. The camera optical path 3C, represented by the two-line arrow, is made up of ambient light reflected by the device under test 302 that is transmitted by the dichroic mirror 316, focused by the variable focus lens 310, and captured and digitized by the camera 312. Data from the camera image can be transmitted to and processed by the computer 340.

A sensor optical path 3A plus 3B, represented by the solid arrows, is made up of laser light emitted from the depth sensor 3A that is transmitted to and reflected from the device under test 302 as reflected light 3B via the dichroic mirror 316 and back to depth sensor 314. The depth sensor 314 is used to determine the distance of the device under test 302 to the camera 312.

The system 300 is designed to accommodate different devices under test 302 with different geometries. In general, it is anticipated that devices under test 302 will be cubic shaped with a flat surface. As such, devices under test 302 with different sizes will have different distances of their surface to the camera 312. FIG. 3 shows that the length of camera optical path 3C as the total distance from the camera 314 to the device under test 302 is the sum of the distance 3C2 from the camera 312 to the dichroic mirror 316 and the distance 3C1 from the dichroic mirror 316 to the device under test 302. FIG. 3 also shows that the length of sensor optical path is the sum of the distance 3A from the depth sensor 314 to the dichroic mirror 316 and the distance 3B from the dichroic mirror 316 to the device under test 302, where 3A=3C2 and 3B=3C1. As such, the lengths of the camera optical path and the sensor optical path are equal. Distances 3C2 and 3A are predetermined and set by locations of the components in the system 300. Distances 3C1 and 3B will vary depending on the configuration of the device under test 302. Control of the variable focus lens 310 is adjusted based on the distances 3C1, 3B so that the camera can always be focused on the surface of the device under test.

FIG. 3 describes system 300 wherein dimension 3C2 has been designed and constructed to be equal to dimension 3A and dimension 3C1 has been designed and constructed to be equal to dimension 3B. During system operation, dimensions 3C1 and 3B are observed to decrease equally and proportionally as CPE or PSU height is increased.

To adjust camera focus in a 'real time' automated fashion, optical path 3A plus 3B (where only 3B and 3C1 are changing) is determined through use of 'Time-Of-Flight (TOF)' depth sensor technology such as that realized in, for example, a Keyence LR-TB5000C depth sensor module or equivalent. Phase difference between a transmitted depth sensor laser beam and the concomitant reflected laser beam is related to optical path 3A plus 3B (where only 3B and 3C1 are changing) in a linear manner. With decreases in optical path 3A plus 3B (where only 3B and 3C1 are changing), one will observe decreases in the following depth sensor characteristics: (1) reflected laser beam time of flight, (2) transmitted and reflected laser beam phase difference, and (3) differential photo-sensor pixel output voltage. For the purpose of vision system camera focus adjustment, differential depth sensor pixel output voltages can be used along with a variable focus lens such as, for example, a Corning® Varioptic® A-25H0 lens or equivalent.

Figure 4:
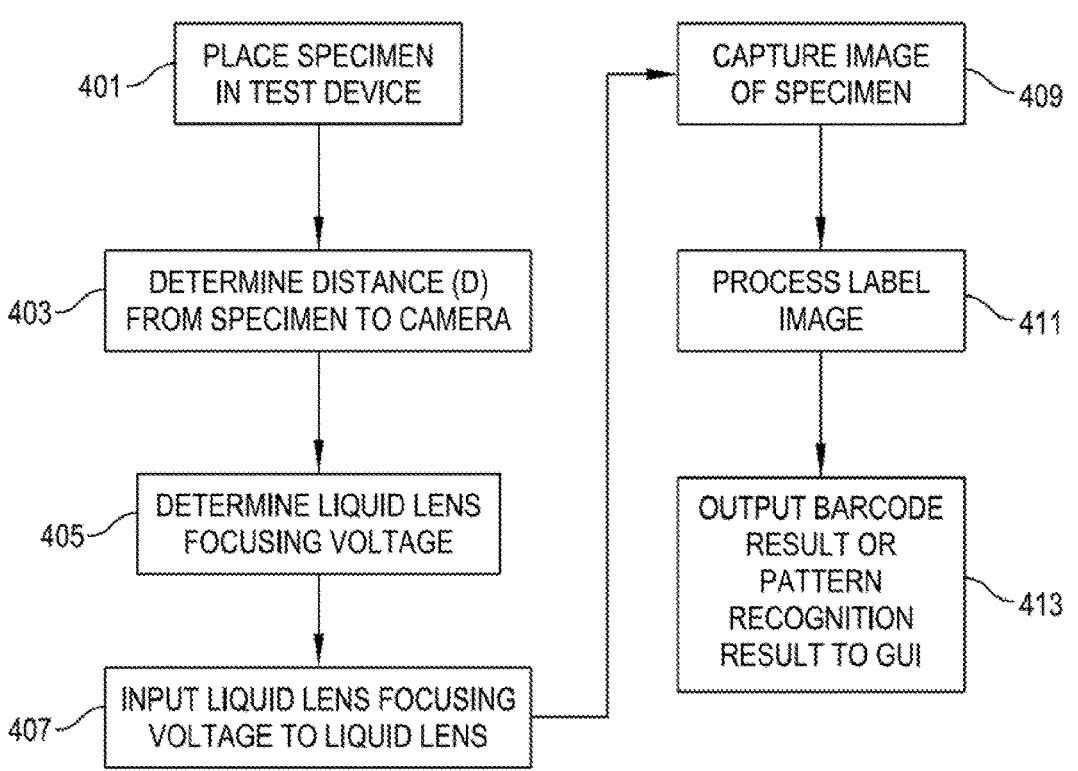
FIG. 4 is a flow chart of operation of a parts matching system according to an embodiment of the present disclosure.

Operation of the system 300 can be more fully described with respect to the flow chart shown in FIG. 4. The system 300 is powered up such that the laser light or crosshair from the depth sensing system is visible on the mount. This feature of the system 300 insures accurate placement of PSU's and CPE's in the system so that acceptable pairing of PSUs with CPEs will be achieved and validated 100% of the time. The software application with GUI is opened on the computer 340. Once the system 300 is powered-on with the laser crosshairs visible and the application is opened on the computer 340, the system 300 is ready for use.

Figure 5:
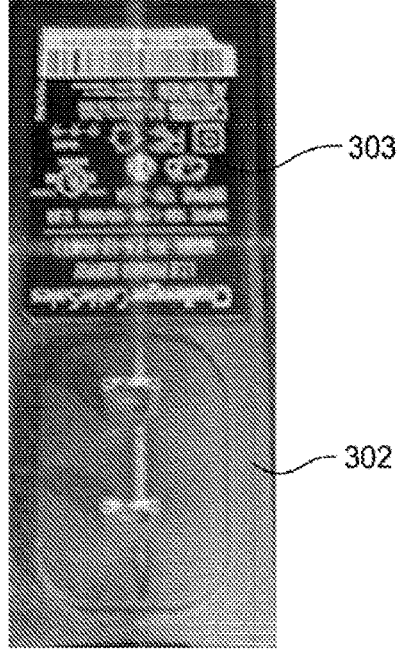
FIG. 5 shows an acceptable orientation of a PSU to the parts matching system.

At step 401, a device under test 302 is properly oriented in location of the system 300. The device under test 302 is oriented so that that marking label is facing toward the optical paths of the depth sensing and vision systems and within the crosshairs. For example, a label can show the Serial Number and/or MAC address of the device under test 302 which can be detected and read by the system 300. FIG. 5 shows an acceptable technique for presenting PSUs as a device under test 302 to the system 300. When placed properly in the system, the PSU model number on a label 303 will be read by the system application by pattern recognition.

In step 403, the depth sensing system 314 and 334 determines the depth sensing optical path distance 3A plus 3B. The depth sensing system 314 and 334 determines the distance to the surface of the device under test 302 as so that the total distance to the camera 312 can also be determined. As previously described, the depth sensing optical path distance 3A plus 3B equals the camera optical path distance 3C1 plus 3C2.

Accordingly, at step 405, a voltage for the liquid lens 310 is determined that corresponds to the working distance of 3C1 plus 3C2. This determination can be made by the computer 340 and performed using a scaling factor, transfer algorithm, or look-up-table (LUT) stored in memory that relate the working distance to the focusing voltage.

At step 407, the computer transmits the focus voltage to the liquid lens 310 to focus the camera 312 to the surface of the device under test 302. The computer 340 sends a command to the variable focus lens controller 330 to set the voltage of the variable focus lens 310 to the value determined from step 405 based on the 3C1 plus 3C2. This ensures that the surface of the device under test 302 including the marking label will be in focus for the camera 312.

At step 409, the vision system 312, 332, and 340 captures a digital image of the surface and marking label of the device under test 302.

At step 411, the computer 340 performs imaging processing of the digital image. The captured image is compared to a database of images to identify the device under test and determine its compatibility with other devices.

At step 413, the result of the comparison is reported to the user via the system application GUI and/or stored in memory. If there is a component match, the user is informed that the PSU is an accepted match for the scanned router (CPE). After PSU-router (CPE) match confirmation has been received in the system application, the user can join the matching PSU to the CPE. If the captured image does not match an image in the vision system database, it will be reported that 'No Match' was found.

After completing the comparison sequence, and a delay (e.g., approximately 10 seconds or less), the system application can be returned to the initial state where another router (CPE) can be scanned and matched to a compatible PSU.

For example, in Keyence based vision systems, a reference image database resides in the 'Vision System Controller' module. The vision system includes an interface with a 'Unit Flow Display' that is operative in a Keyence Vision System Controller. This flow diagram is constructed and configured by a user from a menu of available 'task units'.

Vision system pattern matching and pattern recognition tasks are accomplished within this flow diagram. Camera function selections and lighting functions, CPE barcode reading processes, matching of captured images to reference images, and outputting of CPE barcode reading results and PSU captured image matching results can be controlled by various software modules run within the system application.

The above-described embodiments of the present disclosure can be implemented in any of numerous ways. For example, the embodiments can be implemented using hardware, software, or a combination thereof. When implemented in software, the software code can be executed on any suitable computer, processor, or collection of processors, whether provided in a single computer or distributed among multiple computers. Such processors can be implemented as integrated circuits, with one or more processors in an integrated circuit component. Though, a processor can be implemented using circuitry in any suitable format.

Additionally, or alternatively, the above-described embodiments can be implemented as a non-transitory computer readable storage medium embodied thereon a program executable by a processor that performs a method of various embodiments.

Also, the various methods or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine. Typically, the functionality of the program modules can be combined or distributed as desired in various embodiments.

Also, the embodiments of the present disclosure can be embodied as a method, of which an example has been provided. The acts performed as part of the method can be ordered in any suitable way. Accordingly, embodiments can be constructed in which acts are performed in an order different than illustrated, which can include performing some acts concurrently, even though shown as sequential acts in illustrative embodiments.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A method of matching parts, the method comprising the steps of:
   determining a distance from a device under test to a camera using a laser beam along a first optical path;
   determining a control signal for a lens;
   adjusting a focus of the lens based on the determined control signal;
   capturing an image of the device under test using a second optical path different from the first optical path;
   processing the captured image and comparing the captured image to a predetermined image; and
   displaying a result of the comparison of the captured image to the predetermined image.

2. The method of claim 1 wherein determining the distance from the device under test to the camera comprises determining a time of flight of the laser beam from a depth sensor to the device under test and back to the depth sensor.

3. The method of claim 2 wherein the laser beam reflects off a dichroic mirror positioned between the lens and the device under test.

4. The method of claim 1 wherein determining the distance from the device under test to the camera comprises determining a phase difference between a phase of the laser beam transmitted by a laser source and a phase of the laser beam reflected off the device under test.

5. The method of claim 4 wherein the laser beam reflects off a dichroic mirror positioned between the lens and the device under test.

6. The method of claim 1 wherein the control signal is a voltage to focus a liquid.

7. The method of claim 6 wherein a magnitude of the voltage is based on the determined distance from the device under test to the camera.

8. The method of claim 1 wherein the captured image of the device under test comprises a digital image of a marking label on the surface of the device under test.

9. The method of claim 1 wherein the processing of the captured image comprises comparing the captured image with a plurality of images in a database.

10. The method of claim 1 wherein the displaying of the result of the captured image comprises displaying a message on a graphical user interface (GUI).

11. A non-transitory machine-readable medium having stored thereon a plurality of executable instructions comprising instructions to:
    determine a distance from a device under test to a camera using a laser beam along a first optical path;
    determine a control signal for a lens;
    adjust a focus of the lens based on the determined control signal;
    capture an image of the device under test using a second optical path different from the first optical path;
    process the captured image and comparing the captured image to a predetermined image; and
    display a result of the comparison of the captured image to the predetermined image.

12. The non-transitory machine-readable medium of claim 11 wherein the determined distance from the device under test to the camera comprises determining a time of flight of the laser beam from a depth sensor to the device under test and back to the depth sensor.

13. The non-transitory machine-readable medium of claim 12 wherein the laser beam reflects off a dichroic mirror positioned between the lens and the device under test.

14. The non-transitory machine-readable medium of claim 11 wherein the determined distance from the device under test to the camera comprises determining a phase difference between a phase of the laser beam transmitted by a laser source and a phase of the laser beam reflected off the device under test.

15. The non-transitory machine-readable medium of claim 14 wherein the laser beam reflects off a dichroic mirror positioned between the lens and the device under test.

16. The non-transitory machine-readable medium of claim 11 wherein the control signal is a voltage to focus a liquid lens.

17. The non-transitory machine-readable medium of claim 16 wherein a magnitude of the voltage is based on the determined distance from the device under test to the camera.

18. The non-transitory machine-readable medium of claim 11 wherein the captured image of the device under test comprises a digital image of a marking label on the surface of the device under test.

19. The non-transitory machine-readable medium of claim 11 wherein processing of the captured image comprises comparing the captured image with a plurality of images in a database.

20. The non-transitory machine-readable medium of claim 11 wherein displaying of the result of the captured image comprises displaying a message on a graphical user interface (GUI).

* * * * *